United States Patent
Dickinson et al.

(10) Patent No.: US 8,886,437 B2
(45) Date of Patent: Nov. 11, 2014

(54) CRUISE CONTROL METHOD

(75) Inventors: Michael T. Dickinson, Hilliard, OH (US); Naomichi Tonokura, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 647 days.

(21) Appl. No.: 13/084,928

(22) Filed: Apr. 12, 2011

(65) Prior Publication Data

US 2012/0265394 A1   Oct. 18, 2012

(51) Int. Cl.
| | |
|---|---|
| *B60T 8/32* | (2006.01) |
| *B60K 31/00* | (2006.01) |
| *F02D 41/02* | (2006.01) |
| *F02D 41/12* | (2006.01) |
| *B60W 10/06* | (2006.01) |
| *B60K 31/04* | (2006.01) |
| *B60W 30/16* | (2012.01) |
| *F02D 41/00* | (2006.01) |

(52) U.S. Cl.
CPC ............... *B60K 31/00* (2013.01); *B60W 10/06* (2013.01); *B60W 2720/106* (2013.01); *B60K 31/0008* (2013.01); *B60K 31/047* (2013.01); *B60W 30/16* (2013.01); *B60W 2550/142* (2013.01); *B60W 2710/0605* (2013.01); *B60W 2710/0627* (2013.01); *B60Y 2300/432* (2013.01); *F02D 41/0005* (2013.01); *F02D 41/021* (2013.01); *F02D 41/123* (2013.01); *F02D 2200/501* (2013.01); *F02D 2200/702* (2013.01)
USPC .................... 701/93; 701/94; 701/95; 701/96

(58) Field of Classification Search
CPC ............. B60K 28/16; B60K 2741/205; B60K 31/047; B60K 31/0008; B60T 8/175; B60W 2710/0605; B60W 2720/106; B60W 30/16; B60W 10/06; F02D 2011/102
USPC ........ 701/93, 94, 29, 112, 104; 123/349, 436, 123/399, 348, 90.16, 324, 568.21; 180/179, 180/170, 169; 477/54, 62, 107, 78
See application file for complete search history.

(56) References Cited

U.S. PATENT DOCUMENTS

| | | | |
|---|---|---|---|
| 5,031,715 A | 7/1991 | Ogawa et al. | |
| 5,197,564 A * | 3/1993 | Nishimura et al. | ........... 180/179 |
| 5,609,546 A | 3/1997 | Torii et al. | |
| 5,902,210 A | 5/1999 | Kobayashi et al. | |
| 6,236,929 B1 * | 5/2001 | Sen et al. | ......................... 701/93 |
| 6,304,810 B1 | 10/2001 | Westerberg | |
| 6,389,807 B1 * | 5/2002 | Suzuki et al. | .................... 60/285 |
| 6,411,882 B1 | 6/2002 | Bidner et al. | |
| 6,773,372 B2 * | 8/2004 | Matsubara et al. | ............. 477/78 |
| 7,201,143 B2 * | 4/2007 | Muto et al. | .................... 123/399 |
| 7,308,962 B2 | 12/2007 | Sen et al. | |
| 7,630,817 B2 | 12/2009 | Lock et al. | |
| 2003/0203790 A1 * | 10/2003 | Matsubara et al. | ........... 477/107 |
| 2006/0075990 A1 * | 4/2006 | Muto et al. | .................... 123/399 |
| 2007/0105689 A1 | 5/2007 | Arai | |
| 2012/0184405 A1 * | 7/2012 | Morimura et al. | .............. 477/54 |
| 2013/0253805 A1 * | 9/2013 | Mitsuyasu et al. | ............ 701/112 |

* cited by examiner

*Primary Examiner* — Behrang Badii
(74) *Attorney, Agent, or Firm* — Plumsea Law Group, LLC

(57) ABSTRACT

A method of controlling an engine in a motor vehicle includes opening a throttle to an increased angle when conditions for fuel cut cycling are met. More specifically, when cruise control is on, the motor vehicle is moving downhill, and the current speed drops below a target speed, the engine control unit may choose to increase the angle of the throttle while maintaining fuel cut. Under other interrupting events, the engine control unit may choose to resume fueling control or reduce the throttle angle.

14 Claims, 9 Drawing Sheets

US 8,886,437 B2

CRUISE CONTROL METHOD

BACKGROUND

The present embodiments relate generally to a cruise control method, and some embodiments help to reduce engine braking in an internal combustion engine.

When cruise control is activated, engines often begin fuel cut cycling, where the engine speed cycles above and below a target speed. When above the target speed, fuel cut commences. When below the target speed, fuel control ends. This conventional control scheme is used regardless of the operating conditions of the vehicle.

SUMMARY

The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

One aspect provides a method for controlling a motor vehicle, in particular, a cruise control system of a motor vehicle. The method may include a step of receiving operating information, the operation information including fuel cut information, cruise control information, vehicle speed information and roadway slope information. The method may also include a step of determining that the motor vehicle is operating in a fuel cut mode. The method may also include a step of determining that the motor vehicle is traveling on a downwardly sloped roadway. The method may also include a step of determining that the motor vehicle is operating in a cruise control mode. The method may also include a step of determining a current vehicle speed. The method may also include a step of retrieving a target vehicle speed. Finally, the method may also include a step of maintaining the motor vehicle in the fuel cut mode and increasing a throttle angle opening when the current vehicle speed is less than the target vehicle speed.

Another aspect provides a method for controlling a motor vehicle, the method including a step of receiving operating information, the operation information including fuel cut information, cruise control information, and vehicle speed information and roadway slope information. The method may also include a step of determining that the motor vehicle is operating in a fuel cut mode. The method may also include a step of determining that the motor vehicle is traveling on a downwardly sloped roadway. The method may also include a step of determining that the motor vehicle is operating in a cruise control mode. The method may also include a step of determining a current vehicle speed. The method may also include a step of retrieving a target vehicle speed. The method may also include a step of maintaining the motor vehicle in the fuel cut mode and increasing a throttle angle opening when the current vehicle speed is less than the target vehicle speed. The method may also include a step of determining if an interrupting event has occurred. Finally, the method may also include a step of reducing the throttle opening angle when it is determined that an interrupting event has occurred.

Another aspect provides a method for controlling a motor vehicle, the method including a step of receiving operating information. The method may also include a step of determining that the motor vehicle is operating in a fuel cut mode based on the operating information. The method may also include a step of determining if conditions exist for fuel cut cycling. Finally, the method may also include a step of maintaining the motor vehicle in the fuel cut mode and increasing a throttle angle opening when conditions exist for fuel cut cycling.

Other systems, methods, features and advantages of the embodiments will be, or will become, apparent to one of ordinary skill in the art upon examination of the following figures and detailed description. It is intended that all such additional systems, methods, features and advantages be included within this description and this summary and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

Figure 1:
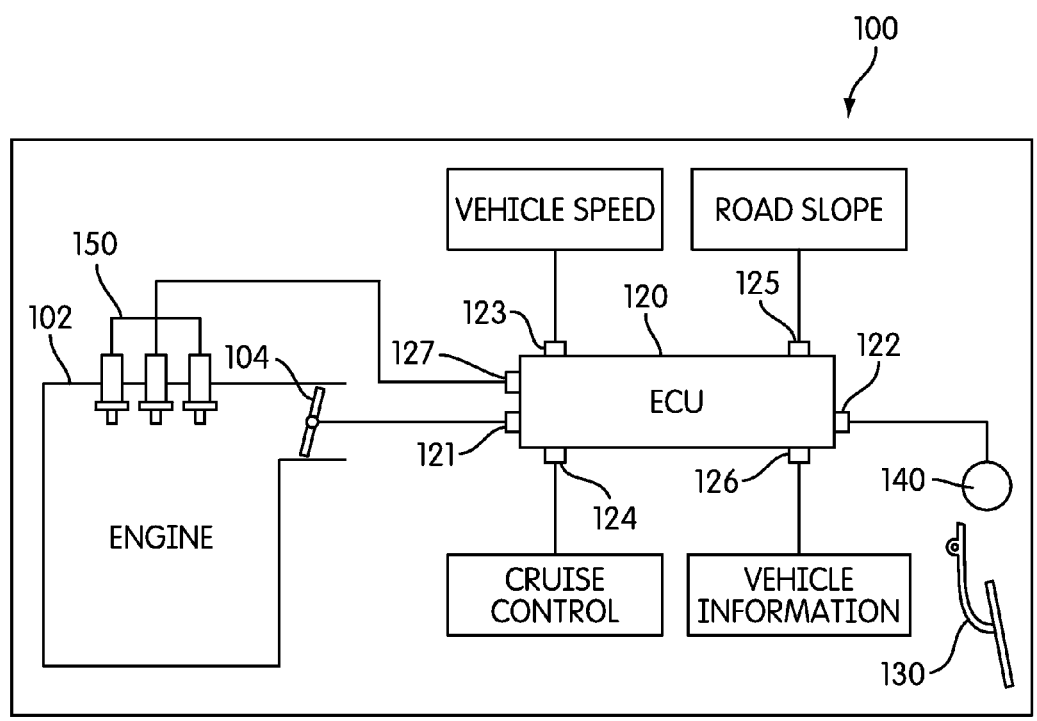
FIG. 1 is a schematic view of an embodiment of a motor vehicle.

FIG. 1 is a schematic view of motor vehicle 100 according to a first embodiment. For purposes of illustration, some components of motor vehicle 100 are shown schematically in this embodiment. In one embodiment, motor vehicle 100 can include engine 102. In some embodiments, motor vehicle 100 can include provisions to regulate an output of engine 102. Typically, during the operation of engine 102, air and fuel are provided to cylinders in engine 102 using a throttle. In this embodiment, engine 102 may include throttle 104 that is configured to control the flow of air into the cylinders. By controlling the flow of air into the cylinders, throttle 104 may control engine speed, fuel consumption, torque, and horsepower.

In some embodiments, motor vehicle 100 can include provisions for a user to control throttle 104. For example, in some embodiments, motor vehicle 100 can include provisions for a user to provide an input. A user can typically provide an input through a control device. In some embodiments, control devices can includes a handlebar throttle control, a lever, dial, or other device through which a user can input a desired state of engine or vehicle operation. In one example of a control device, motor vehicle 100 can include pedal 130. During operation, pedal 130 can be depressed by the user to indicate a desired vehicle speed, engine speed, or other operational condition.

In some embodiments, motor vehicle 100 may include provisions to calculate a position of a control device, such as a pedal. In some cases, as a user provides an input through a control device, that input can be measured. In some embodiments, the control device can associate with a sensor. In a system that includes a pedal, the motion of the pedal may be determined using a sensor. For example, as pedal 130 is moved, the change in position can be measured. In this embodiment, motor vehicle 100 may include pedal position sensor 140. Pedal position sensor 140 may measure the position of pedal 130. In some cases, position sensor 140 may comprise multiple sensors which may be used for redundancy to determine whether position sensor 140 is properly functioning.

Motor vehicle 100 may include provisions for communicating, and in some cases controlling, various components. In some embodiments, motor vehicle 100 may be associated with a computer or similar device. In the current embodiment, motor vehicle 100 may be associated with an electronic control unit, hereby referred to as ECU 120.

ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with ECU 120 are optional. Some embodiments may include a given port or provision, while others may exclude it. The following description discloses many of the possible ports and provisions that can be used, however, it should be kept in mind that not every port or provision must be used or included in a given embodiment.

In some embodiments, an ECU unit can control an engine in a drive by wire configuration. The term "drive by wire" as used throughout this detailed description and in the claims, refers to any system for controlling the operation of various components of a motor vehicle using electrical, rather than mechanical, connections. For example, in some cases, a drive by wire system may include a control unit that receives information from a pedal and then sends a signal to a throttle to automatically open the throttle according to the amount that the pedal has been depressed as well as other factors. In other cases, a pedal may be connected to a throttle both mechanically and electrically, which allows a drive by wire system to control a throttle in some situations and a driver to directly control a throttle in other situations.

In different embodiments, the position of throttle 104 can be controlled in various ways. In some cases, throttle 104 may be associated with electromechanical devices (not illustrated) to adjust the throttle position. In other cases, mechanical devices can be used to control throttle 104. Control devices can be integrated or external to throttle 104.

In some embodiments, ECU 120 can include port 121 for communicating with throttle 104. In some cases, ECU 120 may send signals to control the opening and closing of throttle 104 via port 121. In other words, ECU 120 can control the position of throttle 104 using information sent through port 121.

In some embodiments, ECU 120 can include port 122 for receiving information related to the position of pedal 130. In some cases, ECU 120 may communicate with pedal position sensor 140 using port 122. This arrangement allows ECU 120 to determine the position of pedal 130 for purposes of controlling throttle 104. In some cases, ECU 120 may control throttle 104 in a linear manner according to the position of pedal 130. In other cases, ECU 120 may control throttle 104 in a non-linear manner according to the position of pedal 130. In still other cases, ECU 120 may control the position of throttle 104 according to the position of pedal 130 as well as additional parameters.

In order to control the operation of engine 102, ECU 120 may include provisions to receive vehicle and engine operation information. The vehicle and engine operation information can relate to one or more vehicle and engine parameters or conditions, such as throttle position, engine revolutions per minute, spark timing, and other known aspects of engine control. By evaluating the received information, ECU 120 can determine the proper instruction to provide to one or more systems or components used for controlling engine 102.

In some embodiments, motor vehicle 100 can include provisions to collect information. For example, vehicle information can be collected by sensors located throughout the vehicle. In some embodiments, ECU 120 can include port 126 for receiving additional vehicle information from vehicle sensors. Examples of vehicle sensors can include thermometers, atmospheric pressure gauges, air quality monitors, speedometers, tachometers, accelerometers, wheel slippage indicators, oil pressure gauges, and other known vehicle sensors. Additionally, in some embodiments, external devices may transmit information to ECU 120.

In some embodiments, ECU 120 can include port 123 for receiving vehicle speed information. More specifically, vehicle speed information can include the current speed of the vehicle. The vehicle speed information can be in any form or unit of measurement.

In some embodiments, ECU 120 can include port 124 for receiving information related to the cruise control. In other embodiments, the cruise control information may be stored within ECU 120. Generally, cruise control information may include several different factors including, but not limited to, a flag indicating whether cruise control is activated, a flag indicating whether a target speed is set, and the target speed set by the cruise control.

In some embodiments, ECU 120 can include port 125 for receiving information related to road slope. ECU 120 may calculate an estimated road slope based on any known method including any number of variables. In some cases, these variables may include, but are not limited to, velocity of the vehicle, torque transmitted to the wheels, the resistant torque, and data from an accelerometer. Herein, port 122, port 123, port 124, port 125, and port 126 are referred to as the operating information ports.

Motor vehicle 100 may include provisions for controlling the fuel supplied to engine 102. In some cases, ECU 120 may control fuel injectors 150 that supply fuel to cylinders within engine 102 using port 127. In FIG. 1, three fuel injectors are shown for illustrative purposes. It will be appreciated that engine 102 may comprise any number of fuel injectors. In some cases, each cylinder of engine 102 may comprise one or more fuel injectors used to supply fuel for each cylinder.

The amount of fuel supplied by the fuel injectors may be determined in order to provide a proper air/fuel ratio to the cylinder. Accordingly, the quantity of fuel injected by fuel injectors 150 may depend on the amount of airflow through the cylinders. In turn, this may depend on the positioning of throttle 104. Indeed, the angle of the throttle may affect the amount of air that is able to travel to an intake manifold and, subsequently, back to a cylinder.

A motor vehicle can include provisions for reducing fuel cut cycling. In some embodiments, a motor vehicle can monitor conditions for fuel cut cycling and automatically controlling one or more vehicle systems to reduce the frequency of fuel cut cycling. In one embodiment, the motor vehicle can modify the operation of a throttle in order to reduce fuel cut cycling.

Figure 2:
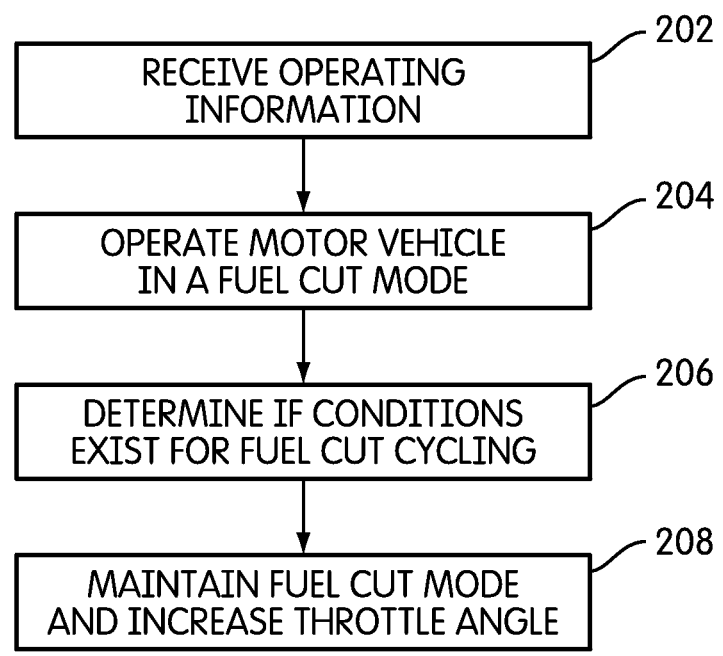
FIG. 2 is an embodiment of a process for reducing engine braking.

FIG. 2 is a process according to an embodiment. In step 202, motor vehicle 100 may receive operating information from various sensors. The operating information may be received by ECU 120 through the operating information ports. Operating information may include, but is not limited to: vehicle speed information, cruise control information, road slope information, and additional vehicle information.

In step 204, motor vehicle 100 may be operating in a fuel cut mode. Specifically, ECU 120 may send information to fuel injectors 150 commanding the fuel injectors 150 not to provide any fuel to their respective cylinders. Such instances are referred to as fuel cut. A fuel cut mode may occur for any number of reasons. In one embodiment, a fuel cut mode may occur when motor vehicle 100 is operating in a cruise control mode. In particular, when a vehicle operating in cruise control is traveling on a downward slope the speed of the vehicle may exceed the target cruising speed. Accordingly, ECU 120 may send information to operate in a fuel cut mode to reduce the vehicle current speed to more closely match the cruise control target speed.

In step 206, motor vehicle 100 may determine that conditions are appropriate for fuel cut cycling. For example, in some cases fuel cut cycling can occur if the current speed varies above and below the target speed. In these situations, the fuel cut mode can be activated and deactivated in a cyclic manner to maintain the target cruising speed. In some cases, fuel cut cycling may cause driveline shock and increased fuel consumption.

In step 208, when conditions exist for fuel cut cycling ECU 120 may choose to maintain fuel cut mode and increase throttle angle. Such cases are described in greater detail with respect to FIGS. 5 and 6.

Figure 3:
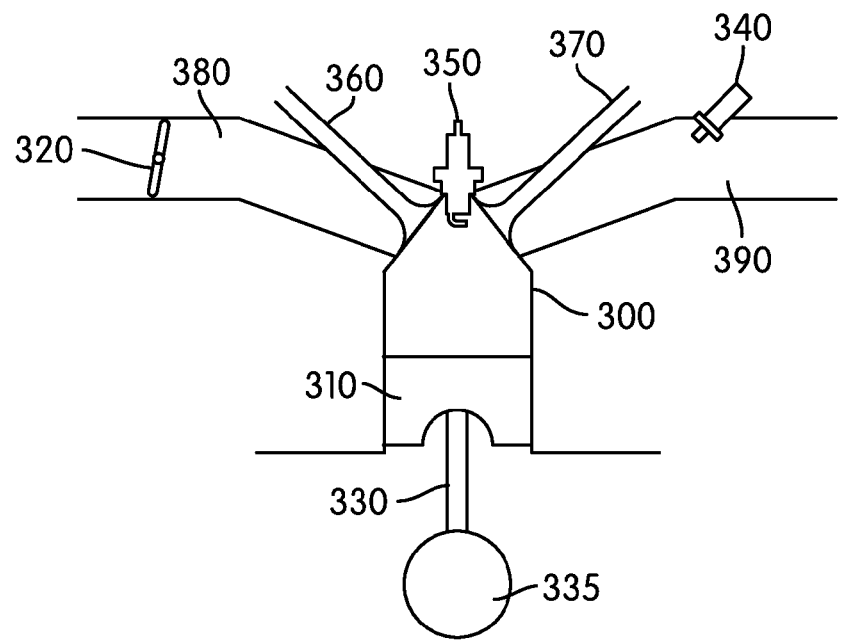
FIG. 3 is a cross-sectional view of an embodiment of a cylinder with a throttle in a substantially closed position.
Figure 4:
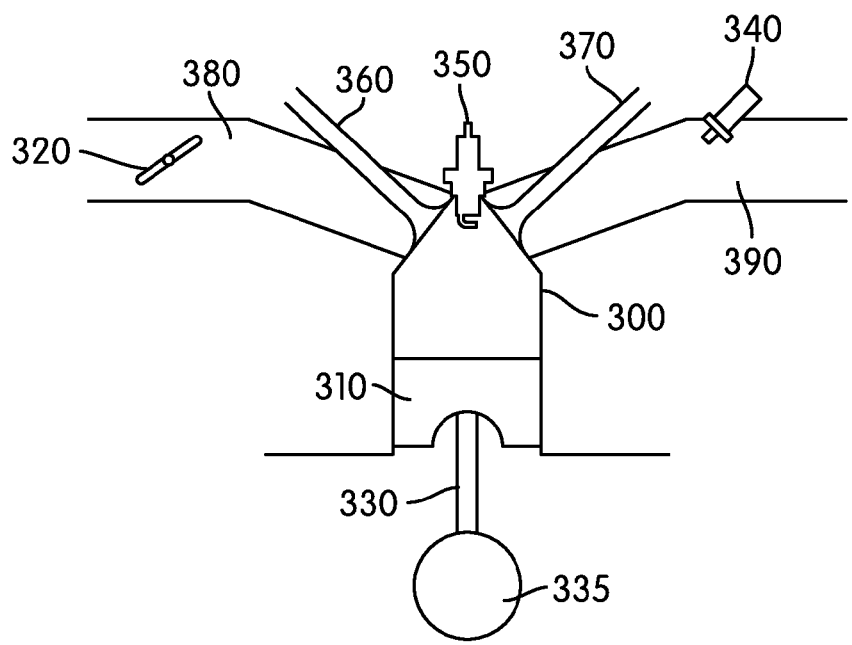
FIG. 4 is a cross-sectional view of an embodiment of a cylinder with a throttle with an increased opening angle.

FIGS. 3 and 4 illustrate a cross-sectional view of cylinder 300 in engine 102. It will be appreciated that while only one cylinder is shown, engine 102 may contain 4 cylinders, 6 cylinders or any other number. The illustration and related description of cylinder 300 equally applies to other cylinders in engine 102.

In FIG. 3, engine 100 may include provisions for igniting fuel. Generally, cylinder 300 may comprise a piston 310. Piston 310 may be controlled by crankshaft 335 using connecting rod 330. As crankshaft 335 rotates, the crankshaft's circular motion may be converted to a reciprocating motion in piston 310. Accordingly, crankshaft 335 and connecting rod 330 may drive piston 310 in an upward and downward motion through cylinder 300. The two opposite motions that comprise a single reciprocation cycle are called strokes.

Engine 100 may operate on a four-stroke cycle. A four-stroke cycle may comprise an intake stroke, a compression stroke, a power stroke, and an exhaust stroke. During an intake stroke, piston 310 may descend from the top to the bottom of cylinder 300, thereby reducing pressure in cylinder 300. If fuel injector 340 is activated, intake valve 370 may open to allow a mixture of fuel and air into cylinder 300 from intake manifold 390. If fuel injector 340 is not activated, no additional fuel is forced into cylinder 300, but air may still enter cylinder 300.

During a compression stroke, piston 310 may be pushed upward through cylinder 300. Exhaust valve 360 may be closed compressing the air and fuel within the cylinder. When fuel exists in cylinder 300, spark plug 350 may ignite the fuel. Alternatively, when substantially no fuel exists in the cylinder, only air is compressed. In this case, the compression stroke may be subject to substantial air resistance, however very little of the resistance translates to a pumping loss. Instead, the resistance may be substantially offset during a subsequent down-stroke, known as power stroke, when the air presses back on piston 310. Accordingly, loss is minimal.

The exhaust stroke may be a final up-stroke in the four-stroke cycle. For the exhaust stroke, exhaust valve 360 may be open allowing the contents of cylinder 300 to be forced into exhaust manifold 380. When the contents of cylinder 300 contain substantially no fuel, throttle 320 may impede the path of the air. Indeed, when throttle 320 is in a substantially closed position, the amount of air resistance is high. The air resistance results in pumping loss and, therefore, engine braking. Accordingly, motor vehicle 100 may slow down.

Alternatively, FIG. 4 illustrates a configuration of an engine in which pumping losses may be reduced. Particularly, throttle 320 may be positioned at an increased angle. During the exhaust stroke, air may be forced through open exhaust valve 360 by piston 310 into exhaust manifold 380. The air may be pushed across throttle 320. When throttle 320 has an increased angle, air may travel through intake manifold 390 with less resistance. This arrangement helps to reduce pumping losses and, therefore, engine braking. Accordingly, the current speed may be not be reduced under such conditions.

Figure 5:
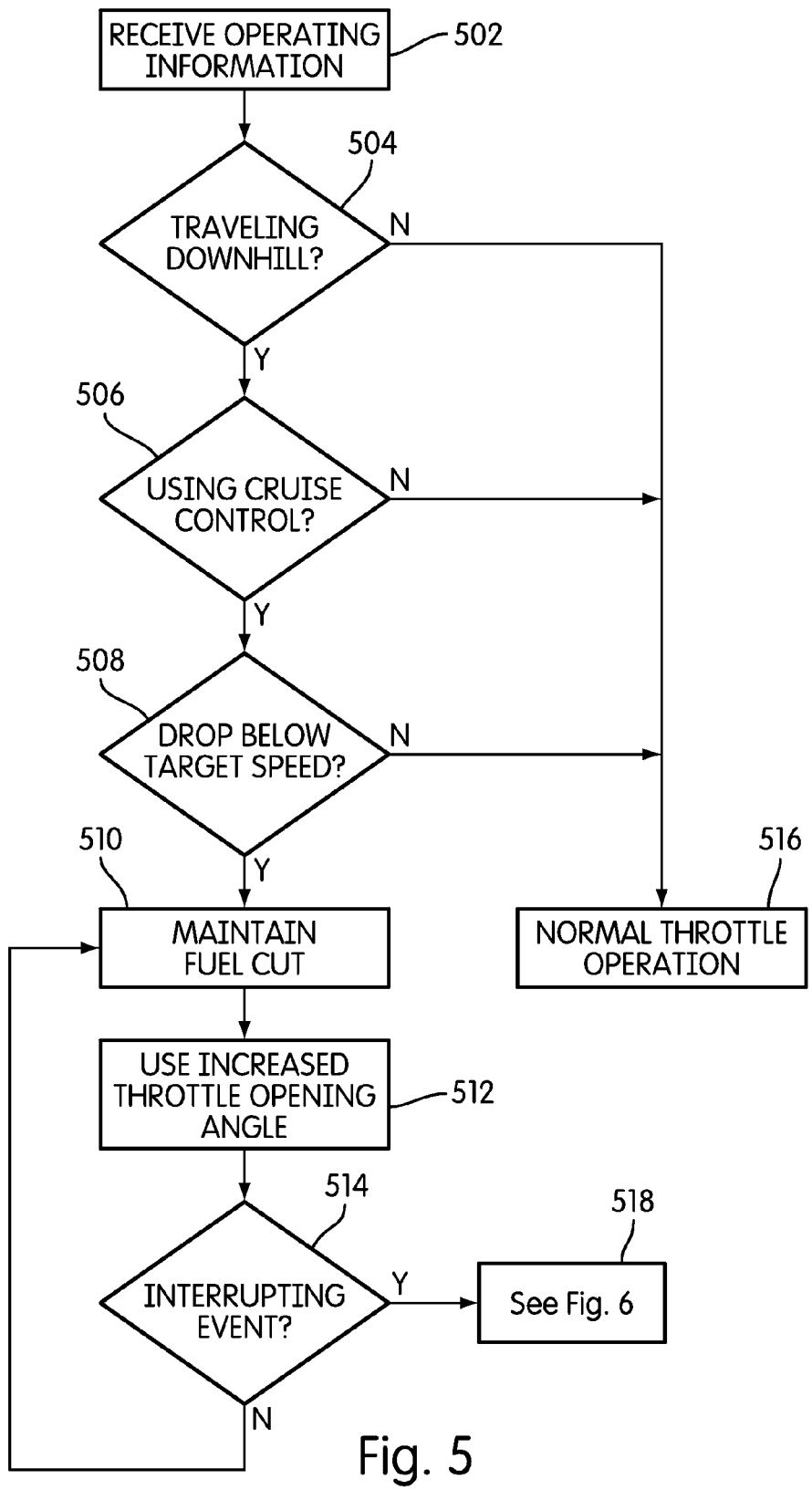
FIG. 5 is an embodiment of a process for determining when to maintain fuel cut and increase throttle opening angle.

FIG. 5 illustrates an embodiment of a process for controlling engine braking in a motor vehicle. In some cases, some of the following steps may be accomplished by a control apparatus. In some cases, some of the following steps may be accomplished by an ECU 120 of a motor vehicle. In other embodiments, some of the following steps could be accomplished by other components of a motor vehicle. It will be understood that in other embodiments one or more of the following steps may be optional.

During step 502 ECU 120 may receive operating information. In some cases, operating information may include pedal information from port 122, vehicle speed information from port 123, cruise control information from port 124, road slope information from port 125 and additional vehicle information from port 126. It will be understood that in different embodiments, any kind of operation information could be received in step 502. Moreover, in some cases, some of the operating information discussed here may be optional.

During step 504, ECU 120 may determine whether vehicle 120 is traveling in a downward slope. To make this determination, ECU 120 may utilize road slope information attained from port 125 during step 502 as well as additional information. The information used may include, but is not limited to velocity of the vehicle, torque transmitted to the wheels, the resistant torque, and data from an accelerometer. ECU 120 may calculate the slope of a roadway based on any known method including using one or multiple algorithms. In some cases, ECU 120 may compare the vehicle acceleration to an expected acceleration on flat ground. If ECU 120 determines vehicle 100 is not traveling in a downward slope, ECU 120 may proceed to step 516. Otherwise, if ECU 120 determines that vehicle 100 is traveling downhill, ECU 120 may proceed to step 506.

During step 506, ECU 120 may determine whether vehicle 100 is using cruise control. To make this determination, ECU 120 may use cruise control information attained from port 124 in step 502 as well as additional factors. Cruise control information may include, but is not limited to, the target speed set and information about whether cruise control is on. ECU 120 may determine whether cruise control is being used based on any known method including using one or multiple algorithms. If ECU 120 determines that vehicle 100 is not using cruise control, ECU 120 may proceed to step 516. Otherwise, if ECU 120 determines that vehicle 100 is using cruise control, ECU 120 may proceed to step 508.

During step 508, ECU 120 may determine whether the current speed of vehicle 120 has fallen below the target speed. To make this determination, ECU 120 may use cruise control information attained from port 124, vehicle speed information attained from port 123 as well as addition factors. ECU 120 may determine whether the current speed has fallen below the target speed based on any known method including using one or multiple algorithms. If ECU 120 determines that the current speed has not fallen below the target speed, ECU 120 may proceed to step 516. Otherwise, if ECU 120 determines that the current speed has fallen below the target speed, ECU 120 may proceed to step 510.

In some embodiments, step 504, step 506 and step 508 may serve as checks for fuel cut cycling conditions. In particular, when a vehicle is traveling down hill, cruise control is active and the vehicle speed drops below a target speed, fuel cut cycling may occur as the motor vehicle attempts to compensate for vehicle speed by reactivating fuel control. It will be understood that in other embodiments other checks could be used to determine if conditions exist for fuel cut cycling.

During step 510, ECU 120 may maintain fuel cut. Specifically, ECU 120 will command fuel injectors 150 not to inject fuel into engine 102. Accordingly, when intake valve 340 is open during the intake stroke, no additional fuel will enter cylinder 300 (see FIG. 3).

During step 512, in order to reduce pumping losses and engine braking as the vehicle slows below the target speed, ECU 120 may use an increased throttle opening angle for throttle 104. In some cases, ECU 120 may calculate the throttle opening angle using a variety of factors. The "increased throttle angle" described herein may include only one of such factors. In some embodiments, ECU 120 may control the absolute angle of throttle 104 to a consistent predetermined angle under the conditions of step 512. In other embodiments, ECU 120 may analyze multiple factors, including the "increased throttle angle" factor, to determine the absolute angle of throttle 104. Accordingly, the absolute angle of throttle 104 during the conditions of step 512 may vary depending on the state of other factors. In some cases, the throttle opening angle may be restricted to a maximum angle during fuel cut.

During step 514, ECU 120 determines if an interrupting event has occurred. The interrupting events are described in greater detail with reference to FIG. 6. If ECU 120 determines an interrupting event has occurred, ECU 120 proceeds to step 518. Otherwise, ECU 120 reverts back to step 510.

During step 516, ECU 120 maintains normal throttle operation. Normal throttle operating refers to conditions under which ECU 120 determines the angle of throttle 104, but does not use "increased throttle angle" as a factor. ECU 120 may still analyze many other factors to determine the proper angle for throttle 104 under normal throttle operation.

Figure 6:
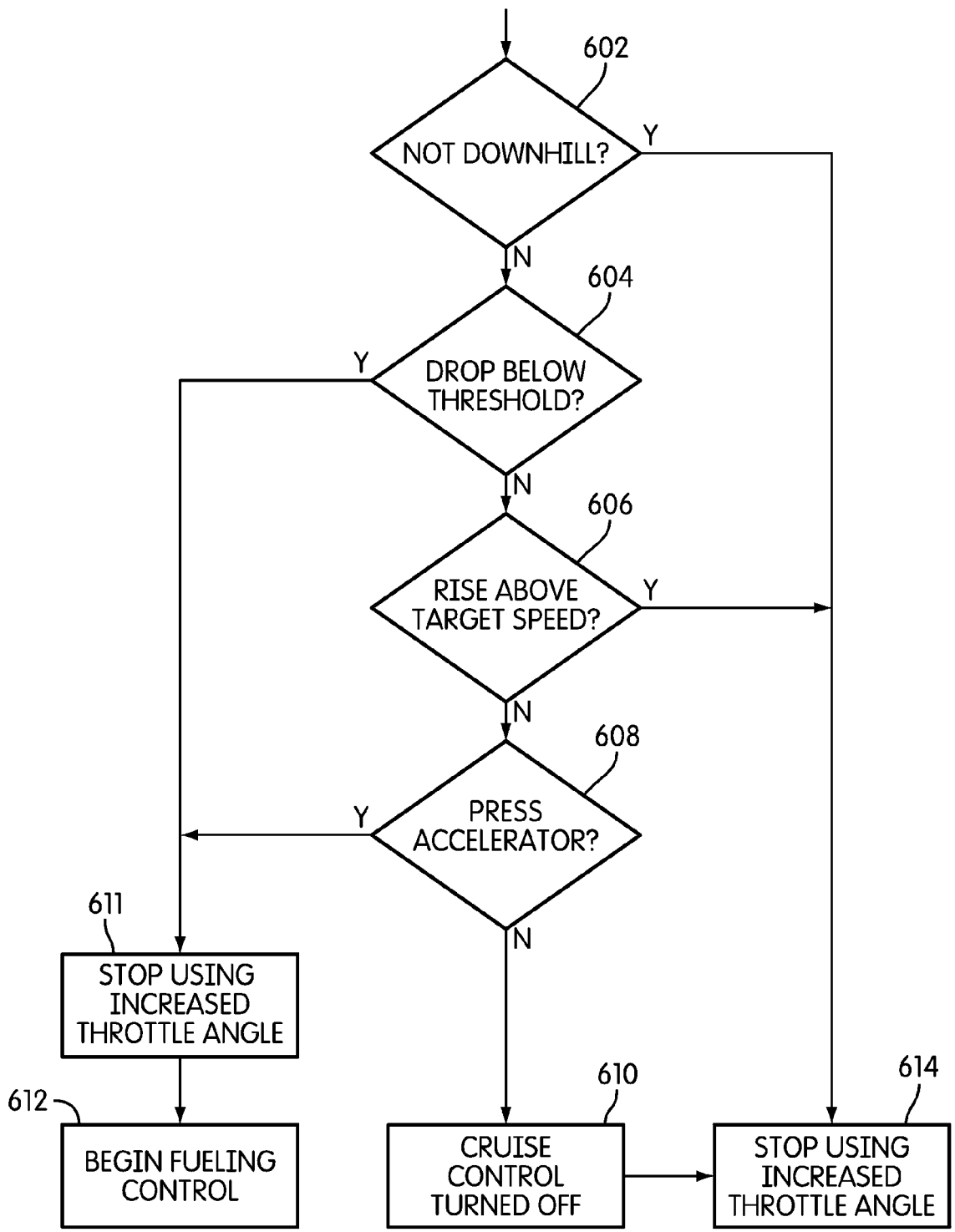
FIG. 6 is an embodiment of a process for removing an incresaed throttle angle or beginning fuel control.

FIG. 6 illustrates an embodiment of a process for controlling engine braking in a motor vehicle. In some cases, some of the following steps may be accomplished by a control apparatus. In some cases, some of the following steps may be accomplished by an ECU 120 of a motor vehicle. In other embodiments, some of the following steps could be accomplished by other components of a motor vehicle. It will be understood that in other embodiments one or more of the following steps may be optional.

FIG. 6 follows from step 518, after ECU 120 detects that an interrupting event has occurred. An interrupting event may be an event that will remove one or more conditions for fuel cut cycling. Such events can occur when fueling control is resumed or there is otherwise no longer a need to reduce engine braking by keeping throttle 104 open at an increased angle. The interrupting event refers to one of the five events represented by step 602, step 604, step 606, step 608, or step 610. These five events are referred to collectively as the interrupting events.

During step 602, ECU 120 may determine whether the interrupting event was vehicle 100 transitioning from a downward slope to a flat or upward slope. ECU 120 may make this determination using information attained from the operating information ports using any known method. If ECU 120 determines that the interrupting event was a transition from a downhill slope, ECU 120 proceeds to step 614, where ECU 120 may stop using an increased throttle angle. Otherwise, ECU 120 proceeds to step 604.

During step 604, ECU 120 may determine whether the interrupting event was the current speed of vehicle 100 falling below the threshold speed. The threshold speed is a predetermined speed below the target speed of the cruise control. In some cases, the threshold speed may be predetermined as an absolute value or an amount relative to the target speed. In other cases, the threshold speed may be a percentage of the target speed. ECU 120 may make this determination using information attained from the operating information ports using any known method. If ECU 120 determines that the interrupting event was a drop of the current speed below the threshold speed, ECU 120 proceeds to step 611, where ECU 120 may stop using an increased throttle angle, and step 612, where fueling is resumed in order to ensure the vehicle speed is increased above the threshold speed. Otherwise, ECU 120 proceeds to step 606.

During step 606, ECU 120 may determine whether the interrupting event was the current speed rising above the target speed. ECU 120 may make this determination using information attained from the operating information ports using any known method. If ECU 120 determines that the interrupting event was the current speed rising above the target speed, ECU 120 proceeds to step 614 where ECU 120 may stop using an increased throttle angle. Otherwise, ECU 120 proceeds to step 608.

During step 608, ECU 120 may determine whether the interrupting event was the user depressing pedal 130. ECU 120 may make this determination using information attained from the operating information ports, including port 122, using any known method. If ECU 120 determines that the interrupting event was the user depressing pedal 130, ECU 120 proceeds to step 611, where ECU 120 may stop using an increased throttle angle, and step 612, where fueling is resumed in order to ensure the vehicle speed is increased above the threshold speed. Otherwise, ECU 120 proceeds to step 610.

During step 610, ECU 120 may determine that the interrupting event was the user turning off cruise control. ECU 120 may confirm this determination using information attained from the operating information ports, including port 124, using any known method. Accordingly, ECU 120 proceeds to step 614, where ECU 120 may stop using an increased throttle angle. In this case, ECU 120 may have reviewed all possible interrupting events. Therefore, since there is no other possibility remaining, in step 610 ECU 120 must determine that the cruise control is turned off. It will be appreciated that in other cases, the tests of step 602, step 604, step 606, step 608, and step 610 may be made in any order or simultaneously.

FIGS. 7 through 13 illustrate various schematic views related to the operation of a motor vehicle according to the embodiments discussed above. In particular, some of these Figures are associated with various steps described in FIGS. 5 and 6. In addition, some of these Figures refer to various provisions shown in FIG. 1.

Figure 7:
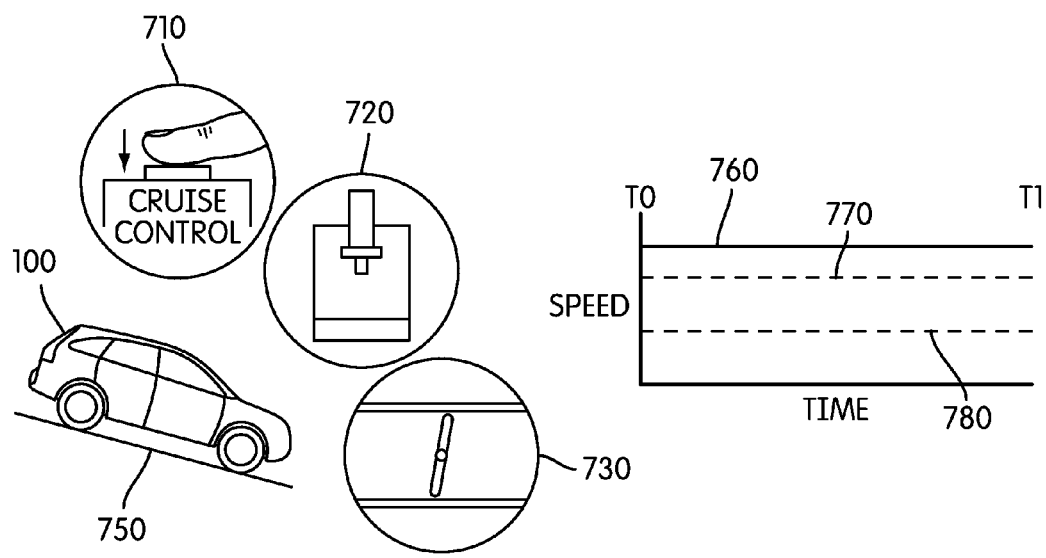
FIG. 7 is a schematic view of an embodiment of a motor vehicle with some conditions for a fuel cut and increased throttle angle.

FIG. 7 illustrates a schematic view of a vehicle under some of the conditions where it may be required to reduce engine braking. The illustration represents vehicle 100 in step 502, step 504, and step 506 of the process described in FIG. 5. Vehicle 100 may be traveling on a roadway 750 downward slope. Cruise control 710 may be in an on position. Moreover, vehicle 100 may travel from time T0 to time T1. During time T0, current speed 760 may be above both target speed 770 and threshold speed 780. As time progresses to time T1, current speed 760 remains above target speed 770 and threshold speed 780. Accordingly, ECU 120 may command fuel injectors 720 not to inject fuel via port 127. Also, ECU 120 may not factor in an increased throttle angle for throttle 730 via port 121.

Figure 8:
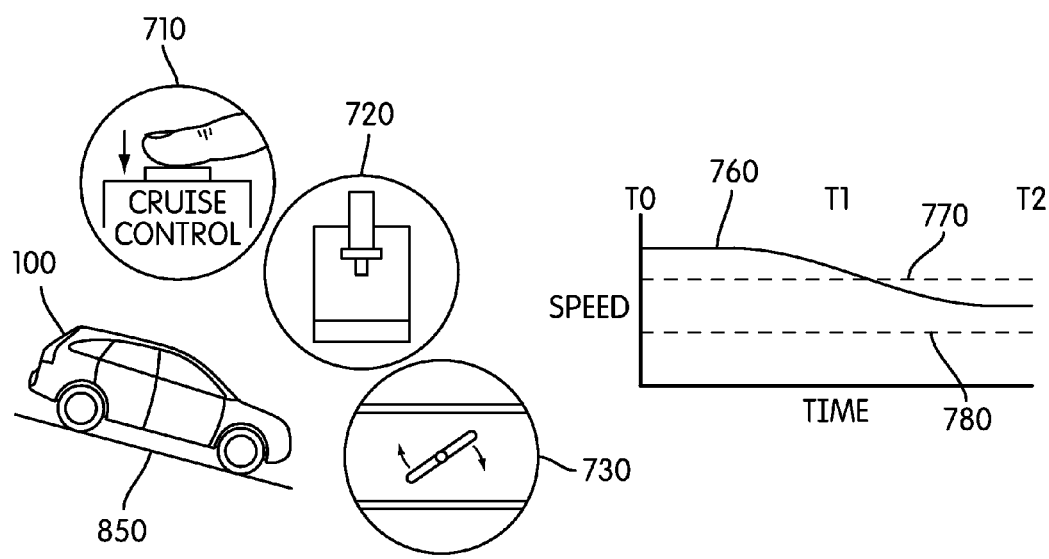
FIG. 8 is a schematic view of an embodiment of a motor vehicle with all conditions for a fuel and increased throttle angle.

FIG. 8 illustrates a schematic view of a vehicle subject to all required conditions to reduce engine braking. The illustration represents vehicle proceeding through step 508, step 510 and step 512 of FIG. 5. Vehicle 100 may travel from time T0 to time T1 without current speed 760 falling below target speed 770 or threshold speed 780. However, at time T1, current speed 760 may fall below target speed 770 but remain above threshold speed 780. Similar to the previous figure, cruise control 710 may remain in an on position. Accordingly, ECU 120 may continue to command fuel injectors 150 not to inject fuel via port 127 as shown in step 510. In order to reduce engine braking, ECU 120 may factor an increased throttle angle for throttle 104 via port 121, as shown in step 512.

Figure 9:
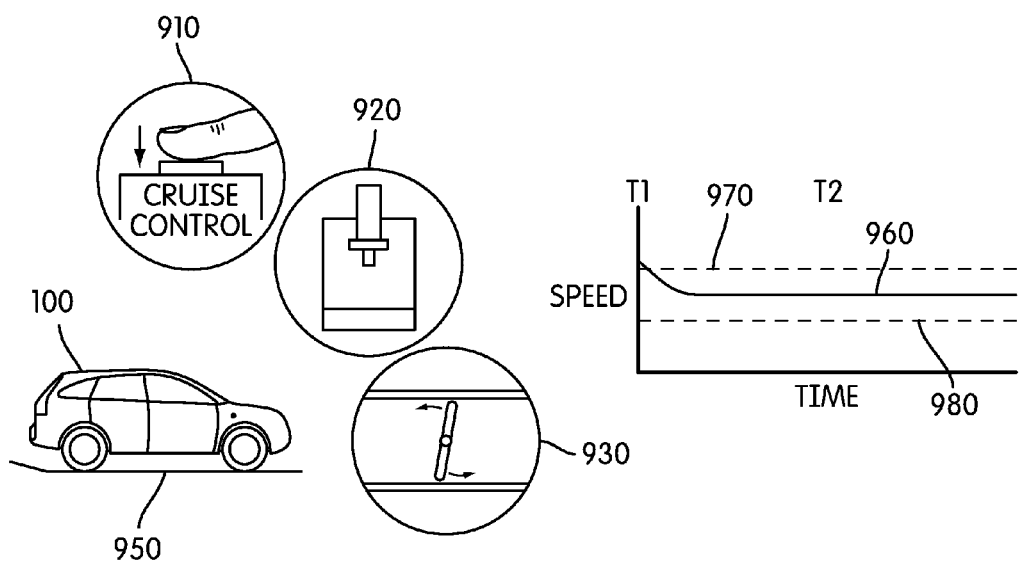
FIG. 9 is a schematic view of an embodiment of a motor vehicle without an increased throttle angle.

FIG. 9 illustrates a schematic view of a vehicle during an interrupting event. More specifically, the illustration represents the determination of step 602 of FIG. 6, where ECU 120 determines whether roadway 950 is not downhill. After time T2, current speed 960 may remain below target speed 970 and above threshold speed 980. Cruise control 910 may remain on. However, roadway 950 may transition from a downward slope to a flat slope. It will be appreciated that FIG. 9 may similarly illustrate an upward slope to the same effect. Accordingly, as ECU 120 proceeds from step 602 to step 614, ECU 120 may stop using the increased throttle angle. In particular, ECU 120 may choose not to factor an increased throttle angle for throttle 930 via port 121. At this time, fuel cut may also be maintained; therefore, fuel injectors 920 may remain off.

Figure 10:
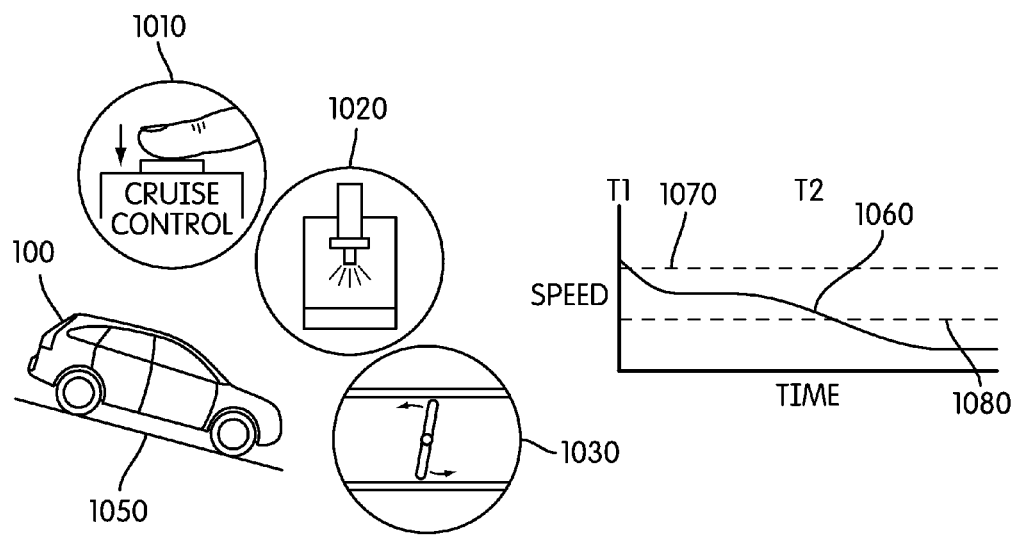
FIG. 10 is a schematic view of an embodiment of a motor vehicle where fuel control has begun.

FIG. 10 illustrates a schematic view of a vehicle during an interrupting event. More specifically, the illustration represents the determination of step 604 of FIG. 6, where ECU 120 determines whether current speed 1060 has fallen. After time T2 current speed 1060 may remain below target speed 1070 and fall below threshold speed 1080. Cruise control 1010 may remain on and roadway 1050 may remain be downwardly sloped. Accordingly, as ECU 120 proceeds from step 604 to step 611 and step 612, ECU 120 may begin fueling control. Under fueling control, ECU 120 may command fuel injectors 1020 to inject fuel into engine 102 via port 127. ECU 120 may also choose not to factor an increased throttle angle for throttle 1030 via port 121.

Figure 11:
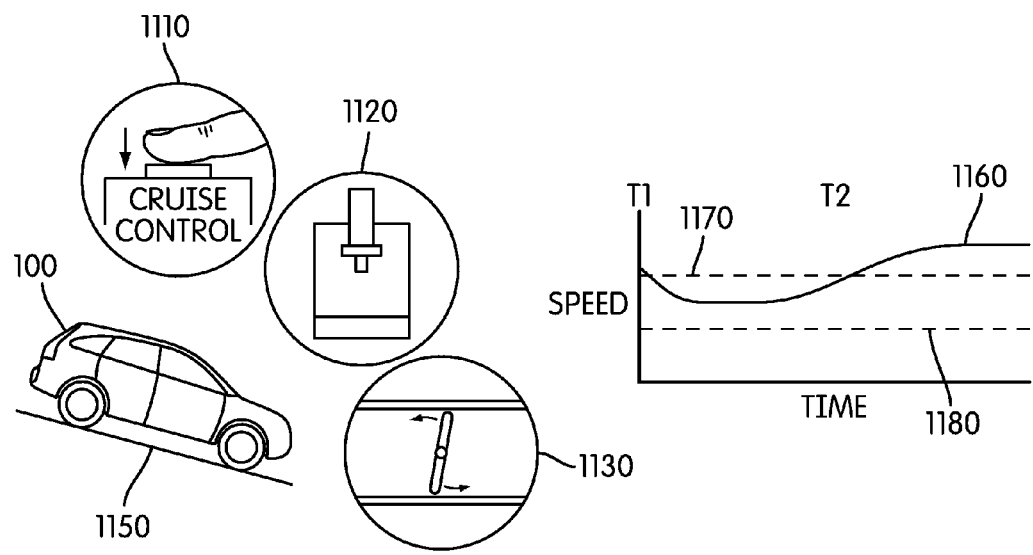
FIG. 11 is a schematic view of an embodiment of a motor vehicle without an increased throttle angle.

FIG. 11 illustrates a schematic view of a vehicle during another interrupting event. More specifically, the illustration represents the determination of step 606 of FIG. 6, where ECU 120 may determine whether current speed 1160 has risen. After time T2, current speed 1160 may remain above threshold speed 1180 and rise above target speed 1170. Cruise control 1110 may remain on and roadway 1150 may remain sloped downward. Accordingly, as ECU 120 proceeds from step 606 to step 614, ECU may stop using the increased throttle angle. In particular, ECU 120 may choose not to factor an increased throttle angle for throttle 104 via port 121. At this time, fuel cut may also be maintained; therefore, fuel injectors 1320 may remain off.

Figure 12:
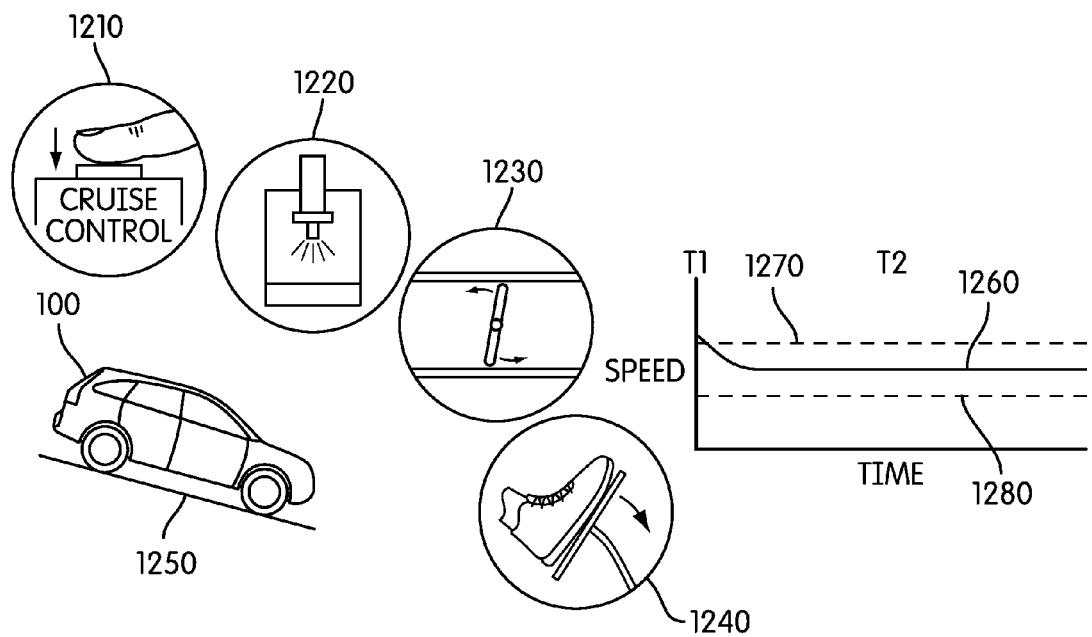
FIG. 12 is a schematic view of an embodiment of a motor vehicle where fuel control has begun.

FIG. 12 illustrates a schematic view of a vehicle during another interrupting event. More specifically, the illustration represents the determination of step 608 of FIG. 6, where ECU 120 may determine whether pedal 130 has been depressed. After time T2, current speed 1260 may remain below the target speed 1270 and above the threshold speed 1280. The cruise control 1210 may remain on and roadway 1250 may remain in a downward slope. However, ECU 120 may detect that the user has depressed pedal 1240 from sensor 140 via port 122. Accordingly, ECU 120 may proceed from step 608 to step 611 and step 612 and may begin fueling control. Under fueling control, ECU 120 may command fuel injectors 1220 to inject fuel into engine 102 via port 127. ECU 120 may also choose not to factor an increased throttle angle for throttle 1230 via port 121.

Figure 13:
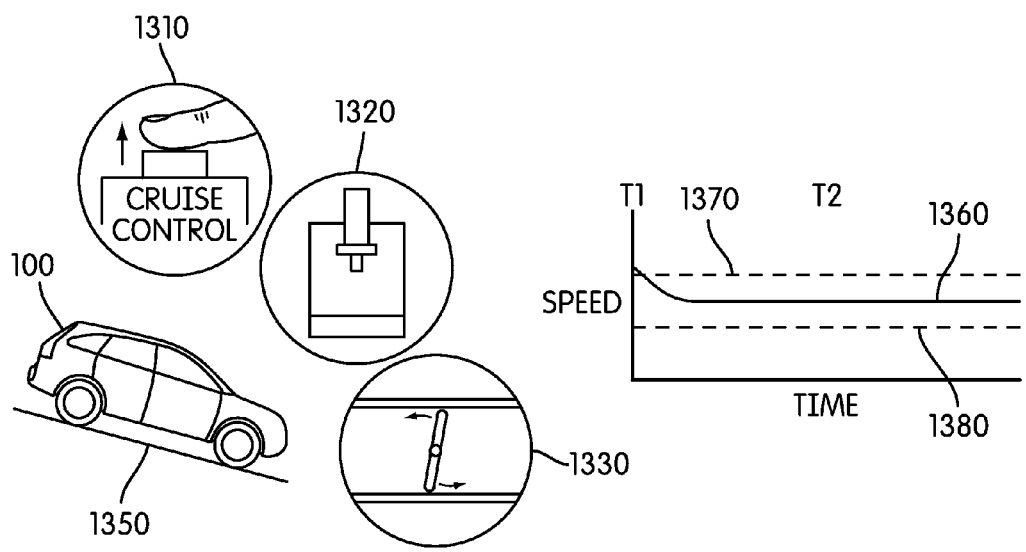
FIG. 13 is a schematic view of an embodiment of a motor vehicle without an increased throttle angle.

FIG. 13 illustrates a schematic view of a vehicle during another interrupting event. More specifically, the illustration represents the determination of step 610 of FIG. 6, where ECU 120 may analyze the state of cruise control 1310. After time T2, current speed 1360 may remain below target speed 1370 and above threshold speed 1380. Roadway 1350 may remain sloped downwardly. However, cruise control 1310 may be turned off. Accordingly, as ECU 120 may proceed from step 610 to step 614, ECU 120 may stop using the increased throttle angle. In particular, ECU 120 may choose not to factor an increased throttle angle for throttle 1330 via port 121. At this time, fuel cut may also be maintained; therefore, fuel injectors 1320 may remain off.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A method for controlling a motor vehicle, the method comprising:
   receiving operating information, the operating information including fuel cut information, cruise control information, vehicle speed information and roadway slope information;
   determining that the motor vehicle is operating in a fuel cut mode, wherein the motor vehicle comprises a plurality of fuel injectors and a plurality of cylinders and the fuel cut mode comprises commanding the plurality of fuel injectors to cut off fuel to the plurality of cylinders;
   determining that the motor vehicle is traveling on a downwardly sloped roadway;
   determining that the motor vehicle is operating in a cruise control mode;
   determining a current vehicle speed;
   retrieving a target vehicle speed;
   maintaining the motor vehicle in the fuel cut mode and increasing a throttle angle opening when the current vehicle speed is less than the target vehicle speed to reduce engine braking and increase the current vehicle speed; and
   determining if the current vehicle speed is equal to or greater than the target vehicle speed and resuming normal throttle operation upon a determination that the current vehicle speed is equal to or greater than the target vehicle speed.

2. The method for controlling a motor vehicle of claim 1, further comprising a step of determining if an interrupting event has occurred and a step of terminating the fuel cut mode or reducing the throttle angle in response to a determination that an interrupting event has occurred.

3. The method of controlling a motor vehicle of claim 2, wherein the step of determining if an interrupting event has occurred includes a step of determining that the motor vehicle has moved from a downwardly sloped roadway to a flat roadway or an upwardly sloped roadway.

4. The method of controlling a motor vehicle of claim 2, wherein the step of determining if an interrupting event has occurred includes a step of determining that the current vehicle speed has increased to at least the target vehicle speed.

5. The method of controlling a motor vehicle of claim 2, wherein the step of determining if an interrupting event has occurred includes a step of determining that the vehicle is no longer operating with cruise control on.

6. The method of controlling a motor vehicle of claim 2, wherein the step of determining if an interrupting event has occurred includes a step of determining that the current vehicle speed has fallen below a predetermined threshold speed.

7. The method of controlling a motor vehicle of claim 2, wherein the step of determining if an interrupting event has occurred includes a step of determining that a pedal has been depressed.

8. A method for controlling a motor vehicle, the method comprising:
   receiving operating information, the operating information including fuel cut information, cruise control information, and vehicle speed information and roadway slope information;
   determining that the motor vehicle is operating in a fuel cut mode, wherein the motor vehicle comprises a plurality of fuel injectors and a plurality of cylinders and the fuel cut mode comprises commanding the plurality of fuel injectors to cut off fuel to the plurality of cylinders;
   determining that the motor vehicle is traveling on a downwardly sloped roadway;
   determining that the motor vehicle is operating in a cruise control mode;
   determining a current vehicle speed;
   retrieving a target vehicle speed;
   maintaining the motor vehicle in the fuel cut mode and (i) increasing a throttle angle opening when the current vehicle speed is less than the target vehicle speed to reduce engine braking and increase the current vehicle speed, and (ii) stopping the increasing of the throttle angle opening when the current vehicle speed is equal to or greater than the target vehicle speed;
   determining if an interrupting event has occurred; and
   reducing the throttle opening angle when it is determined that an interrupting event has occurred.

9. The method of controlling a motor vehicle of claim 8, wherein the step of determining if an interrupting event has occurred includes a step of determining that the motor vehicle is traveling on a flat roadway or an upwardly sloped roadway.

10. The method of controlling a motor vehicle of claim 8, wherein the step of determining if an interrupting event has occurred includes a step of determining that the current vehicle speed has increased to at least the target vehicle speed.

11. The method of controlling a motor vehicle of claim 8, wherein the step of determining if an interrupting event has occurred includes the step of determining that the vehicle is no longer operating with cruise control on.

12. The method of controlling a motor vehicle of claim 8, wherein the throttle angle may not be above a predetermined maximum angle while fuel cut is maintained.

13. The method of controlling a motor vehicle of claim 8, wherein the step of determining whether the motor vehicle is traveling on a downwardly sloped roadway comprises a step of comparing a vehicle acceleration value to an expected acceleration on a flat ground.

14. The method of controlling a motor vehicle of claim 8, further comprising a step of commencing fuel control in response to a determination that an interrupting event has occurred.

* * * * *